United States Patent
Ikeda

(12)
(10) Patent No.: US 6,734,787 B2
(45) Date of Patent: May 11, 2004

(54) APPARATUS AND METHOD OF RECOGNIZING VEHICLE TRAVELLING BEHIND

(75) Inventor: Atsushi Ikeda, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/126,620

(22) Filed: Apr. 22, 2002

(65) Prior Publication Data

US 2002/0154217 A1 Oct. 24, 2002

(30) Foreign Application Priority Data

Apr. 20, 2001 (JP) .......................... 2001-123109

(51) Int. Cl.[7] .............................. B60Q 1/00; G08G 1/00; H04N 7/18; G06K 9/00; G06G 7/70
(52) U.S. Cl. .................... 340/425.5; 340/435; 340/436; 340/903; 340/904; 340/928; 340/937; 348/140; 348/148; 348/149; 382/103; 382/104; 382/106; 382/218; 701/117
(58) Field of Search ................................ 340/435, 436, 340/937, 903, 904, 928; 348/149, 148, 135, 140, 172, 169; 382/103, 104, 106, 218; 701/117

(56) References Cited

U.S. PATENT DOCUMENTS

| | | | | | |
|---|---|---|---|---|---|
| 5,699,057 | A | * | 12/1997 | Ikeda et al. | 340/937 |
| 6,057,754 | A | * | 5/2000 | Kinoshita et al. | 340/435 |
| 6,114,951 | A | * | 9/2000 | Kinoshita et al. | 340/436 |
| 6,411,898 | B2 | * | 6/2002 | Ishida et al. | 701/211 |
| 6,424,272 | B1 | * | 7/2002 | Gutta et al. | 340/937 |
| 6,424,273 | B1 | * | 7/2002 | Gutta et al. | 340/937 |

FOREIGN PATENT DOCUMENTS

| | | | | |
|---|---|---|---|---|
| JP | 10-214399 | 8/1998 | ......... | G08G/1/0965 |
| JP | 11-014346 | 1/1999 | ............. | G08G/7/16 |
| JP | 11-016099 | 1/1999 | ............. | G08G/7/16 |
| JP | 11-306494 | 11/1999 | ......... | G08G/1/0965 |

* cited by examiner

*Primary Examiner*—Jeffery Hofsass
*Assistant Examiner*—Lam Pham
(74) *Attorney, Agent, or Firm*—Smith, Gambrell & Russell

(57) ABSTRACT

Images of objects existing behind a first vehicle are detected to obtain distance data on the objects in relation to the first vehicle for recognizing one of the objects as a second vehicle travelling behind the first vehicle based on the distance data. The type of the second vehicle travelling behind is determined in size based on the images. It is further determined whether the second vehicle is an emergency vehicle based on the images.

16 Claims, 6 Drawing Sheets

APPARATUS AND METHOD OF RECOGNIZING VEHICLE TRAVELLING BEHIND

BACKGROUND OF THE INVENTION

The present invention relates to an apparatus and a method of recognizing vehicles travelling behind.

Recent vehicles are excellent on quietness and sound insulation, so that it is hard for drivers to hear external sounds. If it is a warning sound from an emergency vehicle such as a police car and an ambulance travelling behind, the emergency vehicle could be obstructed by the vehicle travelling ahead due to quietness and sound insulation.

Japanese Unexamined-Patent Publication No. 10-214399 discloses a method of detecting an emergency vehicle travelling close behind and providing the information to drivers by using information offered from special detecting equipment installed on roads.

Moreover, Japanese Unexamined-patent Publication No. 11-306494 discloses a method of detecting an emergency vehicle travelling close behind and providing the information to drivers by using information obtained by in-vehicle camera and microphone equipment.

The former method is, however, disadvantageous in that an emergency vehicle travelling close behind is detected only on roads on which the detecting equipment is installed.

The latter method can be applied on any road but is disadvantageous in that it is hard for drivers to recognize what type of emergency vehicle is travelling close behind, making it difficult to decide what evasive action to take.

SUMMARY OF THE INVENTION

A purpose of the present invention is to provide an apparatus and a method of recognizing vehicles travelling behind, that give effective information to drivers on what type of vehicle is travelling close behind so that drivers can take an appropriate evasive action, thus contributing to a safe and smooth traffic flow.

The present invention provides an apparatus for recognizing a vehicle travelling behind including: a detector for detecting images of objects existing behind a first vehicle in which the apparatus is installed to obtain distance data on the objects in relation to the first vehicle, thus recognizing one of the objects as a second vehicle travelling behind the first vehicle based on the distance data; a first determining unit for determining the type of the second vehicle in size based on the images; and a second determining unit for determining whether the second vehicle is an emergency vehicle based on the images.

Moreover, the present invention provides a method of recognizing a vehicle travelling behind including the steps of: detecting images of objects existing behind a first vehicle to obtain distance data on the objects in relation to the first vehicle, thus recognizing one of the objects as a second vehicle travelling behind the first vehicle based on the distance data; determining the type of the second vehicle in size based on the images; and determining unit for determining whether the second vehicle is an emergency vehicle based on the images.

DETAILED DESCRIPTION OF PREFERRED EMBODIMENTS

A preferred embodiment according to the present invention will be disclosed with reference to the attached drawings.

Figure 1:
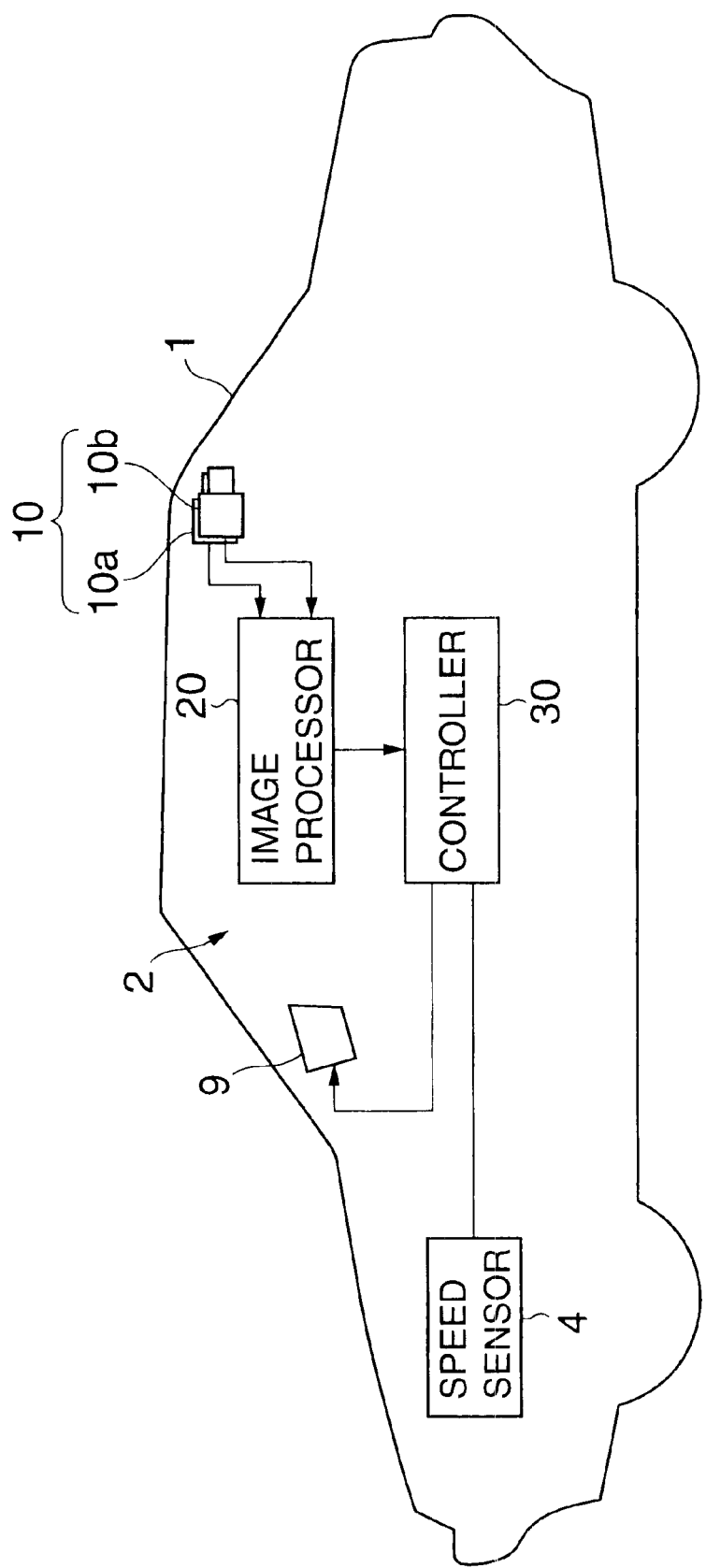
FIG. 1 shows the entire architecture of an apparatus for recognizing a vehicle travelling behind according to the present invention.

FIG. 1 shows a vehicle 1 provided with an apparatus 2 for recognizing a vehicle travelling behind. In the following disclosure, the vehicle 1 will be referred to as the driver's vehicle 1, for which an object existing behind it will be recognized by the apparatus 2 as a vehicle travelling behind.

The apparatus 2 is equipped with stereo optical equipment 10 for taking images of objects existing behind the driver's vehicle 1 from different directions; an image processor 20 for processing the images to obtain three-dimensional distance-distribution data; and a controller 30 for rapidly detecting the shape of the road and three-dimensional positions of several objects based on the three-dimensional distance-distribution data for determining the type of a vehicle travelling behind such as whether it is a large vehicle, a medium-size or compact vehicle or a two-wheeled vehicle, and also whether the vehicle travelling behind is an emergency vehicle. Connected to the controller 30 is a sensor such as a vehicle-speed sensor 4, for detecting travelling conditions of the driver's vehicle.

When the object is a vehicle travelling behind the driver's vehicle 1, the controller 30 controls a screen 9 set in front of a driver to inform the driver of the type of vehicle and whether it is an emergency vehicle.

The stereo optical equipment 10 has a pair of CCD cameras 10a and 10b using charge-coupled devices. The two cameras are arranged on the left and right in the vehicle 1. The CCD camera 10a is used for taking images as reference (original) images whereas the CCD camera 10b is used for taking images for comparison in stereo image processing at the image processor 20.

The image processor 20 obtains correlation between a pair of images taken by the CCD cameras 10a and 10b to calculate the distance of an object, of which the images were taken, from the driver's vehicle 1 based on parallax to the same object using a triangular surveying principle, thus outputting three-dimensional distance distribution data over the images.

The image processor 20 stores the original images taken by the CCD camera 10a as digital data which will be used for detecting a flashing light or a siren peculiar to emergency vehicles in an emergency-vehicle determining procedure which will be disclosed later.

The controller 30 retrieves the three-dimensional distance-distribution data from the image processor 20 for rapidly detecting the shape of the road and three-dimensional positions of several objects (vehicles and any obstacles) to recognize and determine the type of vehicle travelling behind, which will be displayed on the screen 9 for the driver.

In detail, the controller 30 determines whether there is a flashing light peculiar to emergency vehicles, on the vehicle travelling behind based on the original images taken by the CCD camera 10*a*. If there is, it is also indicated on the screen 9 that the vehicle travelling behind is an emergency vehicle.

Figure 2:
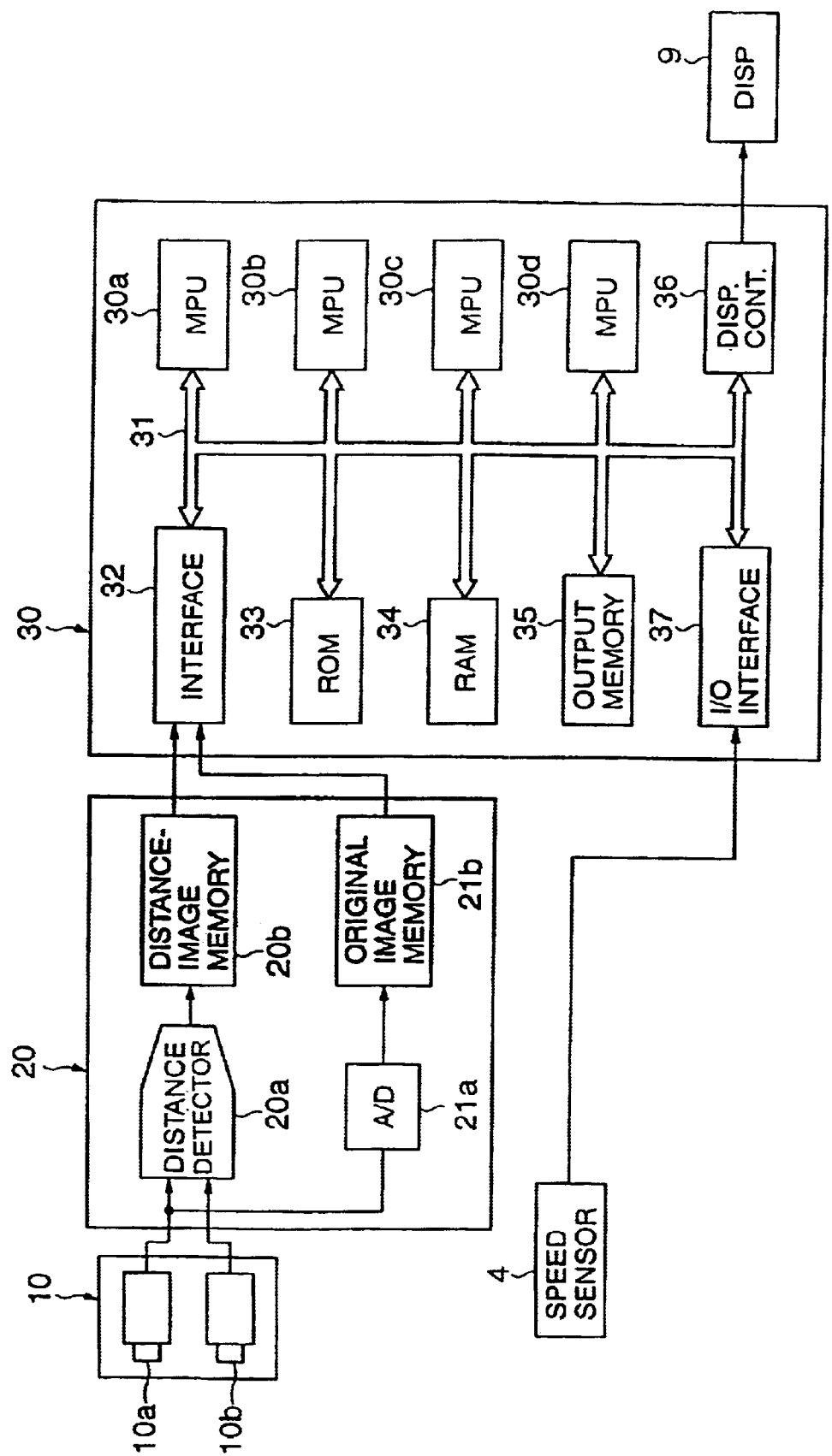
FIG. 2 shows a block diagram of the vehicle travelling-behind recognition apparatus shown in FIG. 1.

The hardware for the image processor 20 and the controller 30 are shown in FIG. 2.

The image processor 20 is equipped with a distance-detecting circuit 20*a* for searching for identical objects per small area on the pair of stereo images taken by the CCD cameras 10*a* and 10*b* and calculating the distance to the object based on displacement between the identical objects, thus outputting the three-dimensional distance-distribution data; a distance-image memory 20*b* for storing the output distance-distribution data; an A/D converter 21*a* for converting analog original (reference)-images taken by the CCD camera 10*a* into digital images at a specific intensity gradation such as 256 gradation; and an original-image memory 21*b* for storing the converted digital images.

Figure 3:
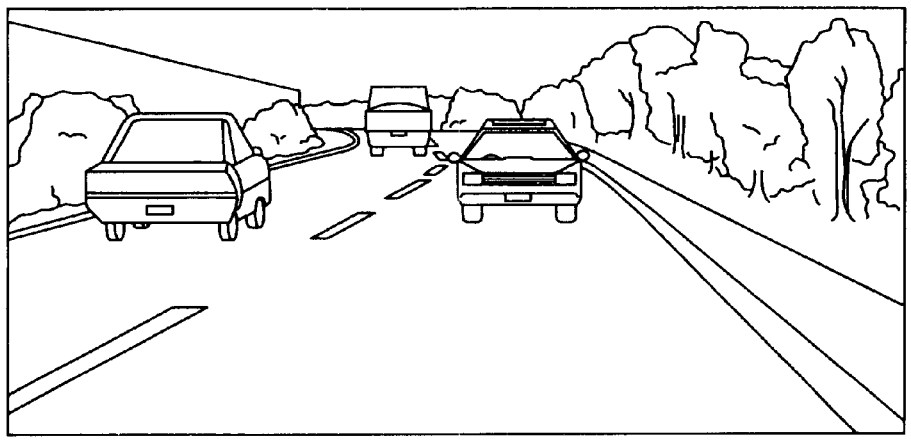
FIG. 3 illustrates an image taken by an in-vehicle camera.

The three-dimensional distance-distribution data output from the distance-detecting circuit 20*a* are expressed as an image (distance image). In detail, the distance-detecting circuit 20*a* processes an image such as illustrated in FIG. 3 taken by the left and right CCD cameras 10*a* and 10*b* to generate a distance image such as illustrated in FIG. 4.

Figure 4:
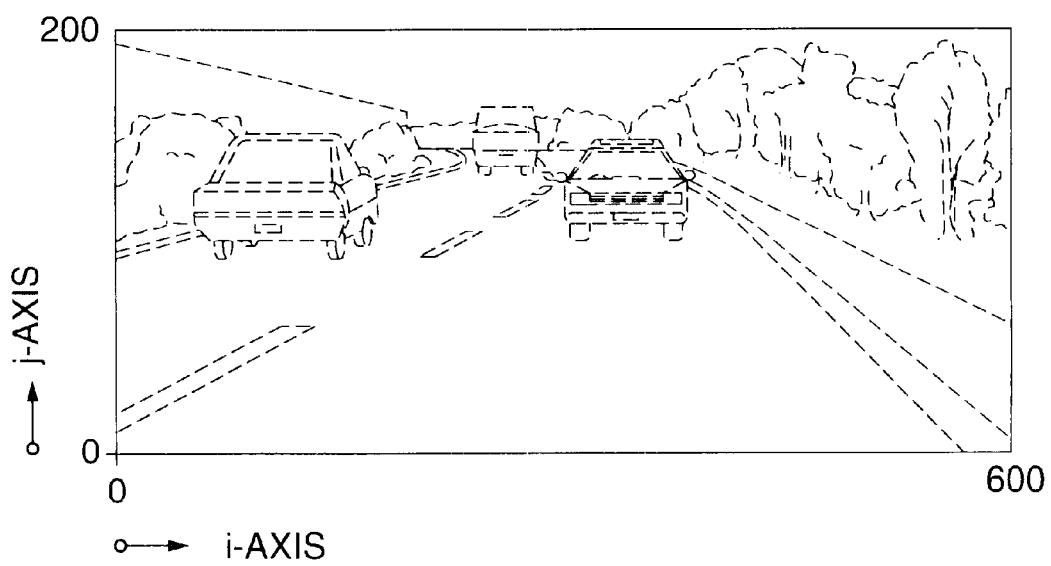
FIG. 4 illustrates a distance image.

The distance image shown in FIG. 4 consists of 600 pixels in horizontal×200 pixels in vertical. The black sections carry the distance data, which correspond to the sections in the image of FIG. 3 with large intensity difference between horizontally adjacent pixels.

The distance-detecting circuit 20*a* handles the distance image as an image of 150 pixels in horizontal×50 pixels in vertical with a small area of 4×4 pixels for one block in calculation of distance (the number of displaced pixels) for each block.

In FIG. 2, the controller 30 is equipped with a microprocessor (MPU) 30*a* for procedures of mainly detecting the shape of of the road; a microprocessor 30*b* for procedures of mainly detecting each object on the road based on the detected road shape; a microprocessor 30*c* for procedures of mainly acknowledging a vehicle travelling behind to determine the type of the vehicle; and a microprocessor 30*d* for procedures of mainly determining whether the vehicle has a flashing light. The microprocessors are connected in parallel via a system bus 31, constituting a multi-microprocessor system.

Connected to the system bus 31 are an interface circuit 32 connected to the distance-image memory 20*b* and the original-image memory 21*b*; a ROM 33 for storing control programs; a RAM 34 for storing several parameters during computation; an output memory 35 for storing several parameters after computation; a display controller (DISP. CONT.) for controlling the screen 9; and an I/O interface circuit 37 for accepting signals from the vehicle-speed sensor 4 and other sensors (not shown).

The controller 30 handles the coordinate system in relation to a distance image, a pixel being a unit thereof, as having the i-axis in the horizontal direction and the j-axis in the vertical direction with the origin (0, 0) at the left lower corner, as shown in FIG. 4. Points (i, j, dp) on the distance image, "dp" being the number of displaced pixels, are converted by the controller 30 into those on a coordinate system in real space, for procedures of road shape recognition and object positional detection, etc.

In detail, it is assumed that the driver's vehicle 1 shown in FIG. 1 is fixed on a three-dimensional coordinate system in real space in which the X-axis is set in the right side of a travelling direction of the vehicle 1, the Y-axis is set over the vehicle 1, and the Z-axis is set in front of the vehicle 1, with the origin set on the road surface just under the middle of the CCD cameras 10*a* and 10*b*.

Under this assumption, the X-Z plane (Y=0) corresponds to the road surface when the road is flat, thus points (i, j, dp) on the distance image are converted into points (x, y, z) in real space in accordance with the following equations (1) to (3):

$$x = CD/2 + z \cdot PW \cdot (i - IV) \tag{1}$$

$$y = CH + z \cdot PW \cdot (j - JV) \tag{2}$$

$$z = KS/dp \tag{3}$$

wherein "CD" is the distance between the CCD cameras 10*a* and 10*b* mounted in the driver's vehicle 1, "PW" is a field angle per pixel, CH is a height for each CCD camera mounted in the vehicle 1, "IV" and "JV" are coordinates (pixels) in an image at infinite distance in absolute front of the vehicle 1, and "KS" is a distance coefficient (KS=CD/PW).

The equations (1) to (3) are modified as shown below for calculation of points (i, j, dp) on the distance image from points (x, y, z) in real space.

$$i = (x - CD/2)/(z \cdot PW) + IV \tag{4}$$

$$j = (y - CH)/(z \cdot PW) + JV \tag{5}$$

$$dp = KS/z \tag{6}$$

Disclosed next are the procedures performed by the controller 30.

Firstly, the microprocessor 30*a* performs a road detection procedure as follows: Lane-marker data on a real road are extracted from three-dimensional positional data on a distance image stored in the distance-image memory. The extracted data are used for modifying or altering road-model parameters installed in the microprocessor 30*a* so that they will match an actual road shape for road-shape recognition.

The road model consists of broken-line graphs each formed of lane markers, located at left and right of the driver's vehicle 1, approximated by three-dimensional equations of lines, for each of several intervals for which the lane markers are divided in accordance with a set distance.

Parameters "a" and "b", and "c" and "d" in the horizontal direction and the vertical direction, respectively, for equations of lines on the coordinate system in real space are then given to obtain the following equation of lines (7) in the horizontal direction and the equation of lines (8) in the vertical direction.

$$x = a \cdot z + b \tag{7}$$

$$y = c \cdot z + d \tag{8}$$

The left and right lane markers are approximated by the equations of lines (7) and (8), respectively, to obtain, per interval, parameters "aL", "bL", "cL" and "dL" for the equation of lines for the lane marker that is located at the left side of the travelling driver's vehicle 1, and parameters "aR", "bR", "cR" and "dR" for the equation of lines for the lane marker that is located at the right side of the travelling vehicle 1. These parameters are stored in the RAM 34.

Figure 5:
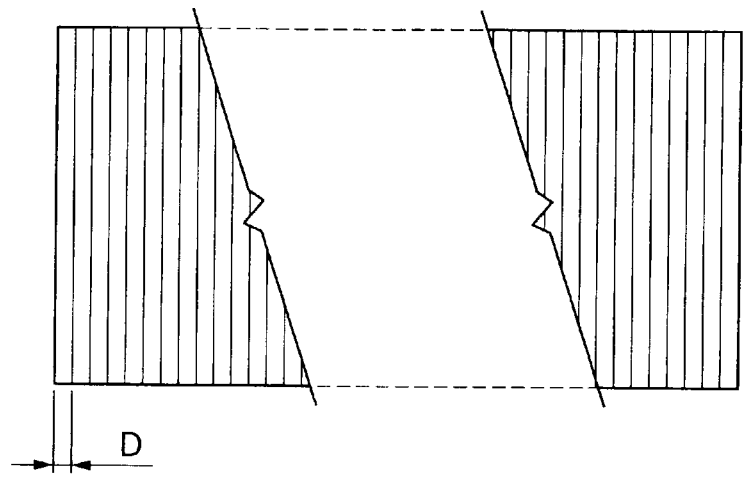
FIG. 5 illustrates segments into which a distance image is divided.
Figure 6:
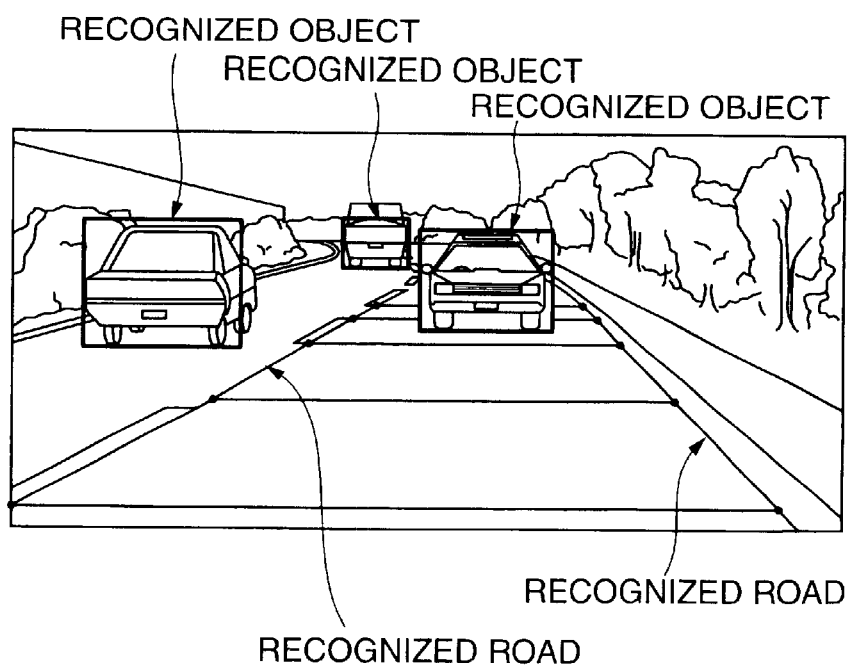
FIG. 6 illustrates a road and three-dimensional objects recognized by the vehicle travelling-behind recognition apparatus.

Next, the microprocessor 30b performs an object detection procedure as follows: A distance image is divided into grid-like segments as illustrated in FIG. 5 per given distance "D". The height of road surfaces distant from the driver's vehicle 1 by a distance "z" are given per segment with the equations (7) and (8) obtained by the microprocessor 30b. The object detection procedure is actually performed by a three-dimensional object detector 70 shown in FIG. 7.

Distance data above the height of road surfaces are extracted as three-dimensional object data. A histogram is then formed with the extracted data for obtaining the location of a three-dimensional object representative on each segment and its distance from the driver's vehicle 1.

The obtained distance for the representative object on each segment is examined to determine that the same object exists over adjacent segments when a difference in distance from the driver's vehicle 1 to the representative objects on the adjacent segments is smaller than a set value whereas different objects exist on the adjacent segments when the difference is larger than the set value.

A two-dimensional window is set based on calculation as to how a three-dimensional window involving the detected objects will be viewed on a two-dimensional image. Data in the two-dimensional window are surveyed one by one to calculate three-dimensional positions (x, y, z) of pixels carrying the distance data by using the equations (1) to (3). Data for which distance and height values are involved in the three-dimensional window are only extracted whereas the other data are nullified.

The extracted data are projected onto the two-dimensional image for obtaining outline images of the three-dimensional objects by connecting contours of the extracted data with lines. The distance (Z-axis), the left and right edge positions (X-axis) and the upper position (Y-axis) are calculated for each object from the coordinates (i, j, dp) at the left and right edges and the upper edge on each outline image. Also calculated are a width of each object based on the left and right edge positions and a height of each object based on the upper position. The calculated values are stored in the RAM 34.

The procedures of generating a distance image, detecting a road shape from the distance image (performed by a road detector 60 in FIG. 7) and detecting several three-dimensional objects from distance data on the objects per segment on the distance image explained so far are disclosed in detail in Japanese Unexamined-Patent Publication No. 5-265547.

The microprocessor 30c compares the detected road shape and the locations of the three-dimensional objects to identify a vehicle travelling behind and determine the type of the vehicle in its size, and calculating a relative speed between the driver's vehicle 1 and the vehicle travelling behind (the vehicle-type determining procedure).

The microprocessor 30d determines whether the vehicle travelling behind has a flashing light peculiar to emergency vehicles and decides that the vehicle is an emergency vehicle if it has the light (the emergency-vehicle determining procedure).

The data on the type of the vehicle travelling behind and other data on the vehicle such as the relative speed obtained through the vehicle-type determining procedure and also the data on the vehicle as to whether it is an emergency vehicle obtained through the emergency-vehicle determining procedure are displayed on the screen 9 to be informed to the driver.

Disclosed next in detail are the vehicle-type determining procedure and the emergency-vehicle determining procedure performed by the microprocessors 30c and 30d, respectively.

Figure 7:
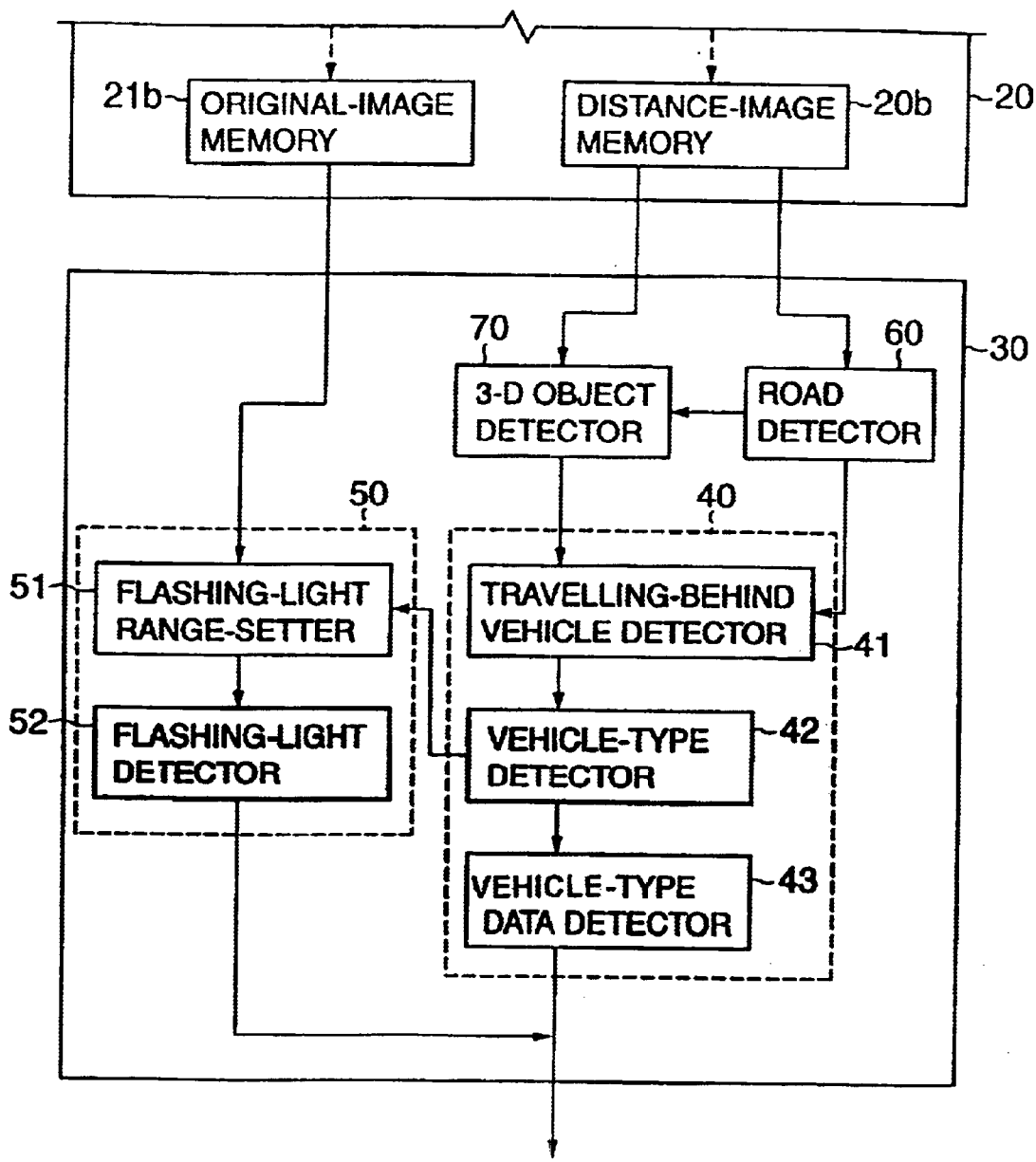
FIG. 7 shows a functional block diagram for vehicle-type determining and emergency-vehicle determining procedures.

FIG. 7 shows a functional block diagram of the microprocessors 30c and 30d.

A vehicle-type determining unit 40 of the microprocessor 30c is equipped with a travelling-behind vehicle detector 41, a vehicle-type detector 42 and a vehicle-type data detector 43.

An emergency-vehicle determining unit 50 of the microprocessor 30d is equipped with a flashing-light range setter 51 and a flashing-light detector 52.

The three-dimensional object detector 70 and the road detector 60 are provided for the microprocessors 30a and 30b, respectively, and their functions have already been disclosed above.

Disclosed first is the vehicle-type determining procedure performed by the microprocessors 30c.

In operation, the travelling-behind vehicle detector 41 recognizes a vehicle travelling behind based on the detected data on the vehicle such as a distance "Zi" of the vehicle from the driver's vehicle 1, a left-edge position "XiL" and a right-edge position "XiR".

In detail, the recognition of a vehicle travelling behind starts with calculation of left and right lane-marker positions "XL" and "XR" at the distance "Zi" from the driver's vehicle 1, using road-shape data, as follows:

$$\text{Left Lane Marker: } XL = aL \cdot Zi + bL \quad (9)$$

$$\text{Right Lane Marker: } XR = aR \cdot Zi + bR \quad (10)$$

The left and right lane-marker positions "XL" and "XR" given by the equations (9) and (10) and the left- and right-edge positions "XiL" and "XiR" are compared with each other, respectively, to select several objects that overlap the inner side of at least either lane marker as candidates for a vehicle travelling behind. One of the candidates that is the closest to the driver's vehicle 1 is then recognized as the vehicle travelling behind. The positional data for this vehicle travelling behind are stored in the RAM 34.

Figure 8:
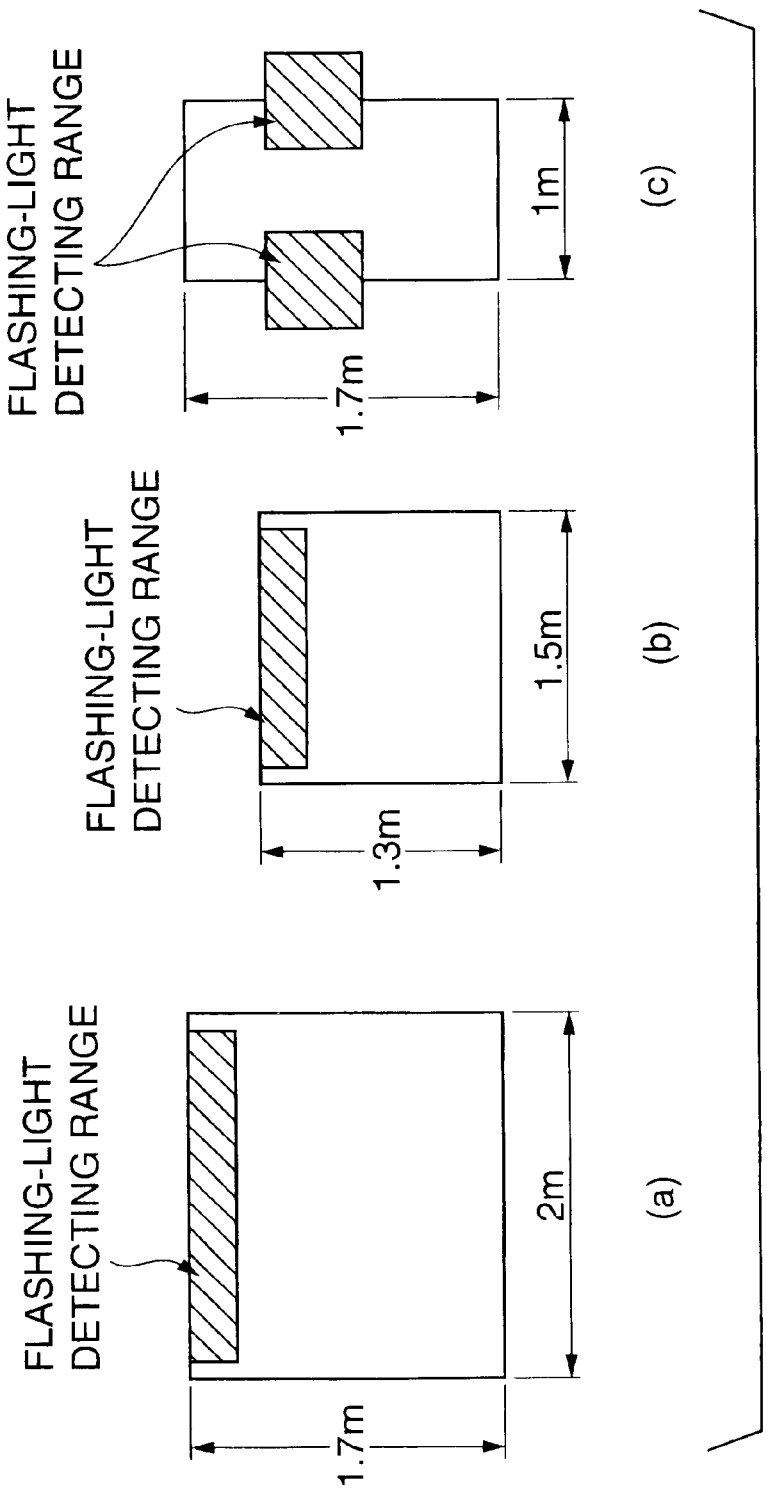
FIG. 8 illustrates detecting ranges depending on the types of vehicles.

On recognition of the vehicle travelling behind by the travelling-behind vehicle detector 41, the vehicle-type detector 42 performs comparison on the vehicle travelling behind to determine the type of the vehicle, with three types of reference range data (FIG. 8) stored in the ROM 33.

In detail, as illustrated in FIG. 8(a), the vehicle travelling behind is determined as a large vehicle when its width is 2 m or wider and its height is 1.7 m or higher. It is determined as a medium-size or compact vehicle when its width is 1.5 m or wider and its height is 1.3 m or higher, as illustrated in FIG. 8(b). Or, it is determined as a two-wheeled vehicle when its width is 1 m or narrower and its height is 1.7 m or shorter, as illustrated in FIG. 8(c).

The vehicle-type data determined by the vehicle-type detector 42 are stored in the RAM 34 and displayed on the screen 9, and further sent to the flashing-light range setter 51.

The vehicle-type data detector 43 calculates a relative speed of the vehicle travelling behind with respect to the driver's vehicle 1 based on variation of distance in time between the two vehicles and adds a speed of the vehicle 1 detected by the speed sensor 4 to the calculated relative speed to obtain a speed of the vehicle travelling behind.

Disclosed next is the emergency-vehicle determining procedure performed by the emergency-vehicle determining unit 50 of the microprocessor 30d.

In the emergency-vehicle determining unit 50, the flashing-light range setter 51 sets a range for detecting a flashing light, mounted on the vehicle travelling behind, on an image digitized, for example, at 256 gradations, for each pixel (intensity) of the image, with respect to the digital image stored in the original-image memory 21b, or the reference analog image taken by the CCD camera 10a. The type of flashing light depends on the type of vehicle travelling behind.

The detecting range for a flashing light for each type of vehicle travelling behind is set at the upper section of a vehicle body, as illustrated in FIG. 8(a), for a large vehicle, and also for a medium-size or compact vehicle, as illustrated in FIG. 8(b). It is, however, set at almost middle section for a two-wheeled vehicle, as illustrated in FIG. 8(c).

The flashing-light detector 52 calculates the average of intensity for pixels in the flashing-light detecting range set by the flashing-light range setter 51 and sets an intensity level higher than the average (for example, 1.5 times the average) as a threshold level, for extracting pixels brighter than the threshold level within the detecting range, and further determines whether the bright pixels exhibit periodical change in intensity.

It is determined that the vehicle travelling behind is an emergency vehicle when the bright pixels exhibit periodical change in intensity, which is then displayed on the screen 9 as character or graphic information.

Not only police cars, ambulances, and fire engines, but also any vehicles having flashing lights are determined as emergency vehicles in this invention for a safe and smooth traffic flow.

As disclosed above, the vehicle travelling-behind recognition according to the embodiment offer a driver information on the type of a vehicle travelling behind and also whether the vehicle is an emergency vehicle, thus the driver can calmly take an evasive action such as giving way to the emergency vehicle.

Moreover, even if the vehicle travelling behind is not an emergency vehicle, the vehicle travelling-behind recognition according to the embodiment offers a driver information on the type of the vehicle travelling behind and its speed, thus the driver can drive safely with no sudden braking but giving way to the vehicle travelling behind, etc., for a safe and smooth traffic flow.

What is claimed is:

1. An apparatus for recognizing a vehicle travelling behind comprising:
   a detector for detecting an image of an object existing behind a first vehicle in which the apparatus is installed for recognizing a second vehicle which is the object travelling behind the first vehicle;
   a first determining unit for determining a type of the second vehicle in size based on the image; and
   a second determining unit for determining whether the second vehicle is an emergency vehicle based on the image.

2. The apparatus according to claim 1 further comprising an informing unit for informing a driver driving the first vehicle of information on the results determined by the first and second determining units.

3. The apparatus according to claim 1, wherein the second determining unit determines whether the second vehicle is the emergency vehicle is made by comparing intensity in the second vehicle of the image with the reference intensity.

4. The apparatus according to claim 1, wherein the detector has a pair of cameras, one of the cameras taking an image as a reference image of the object existing behind the first vehicle and the other taking an image of the image for comparison with the reference image in stereo image processing to obtain three-dimensional distance distribution of the image from the first vehicle.

5. The apparatus according to claim 4, wherein the detector recognizes the image as the second vehicle travelling behind based on a distance of the image from the first vehicle in the three-dimensional distance distribution.

6. The apparatus according to claim 4, wherein the first determining unit compares the image recognized as the second vehicle travelling behind with reference objects in size to determine the second vehicle as a large vehicle, a medium-size or compact vehicle or two-wheeled vehicle.

7. The apparatus according to claim 4, wherein the second determining unit compares intensity on a specific area on the the object recognized as the second vehicle travelling behind with a reference intensity in the image, the specific area depending on the type of the second vehicle, and determines that the second vehicle is equipped with a flashing light, thus deciding that the second vehicle is the emergency vehicle, if the intensity on the specific area is higher than the reference intensity and exhibits periodical change.

8. A method of recognizing a vehicle travelling behind comprising:
   detecting an image of an object existing behind a first vehicle for recognizing a second vehicle which is the object travelling behind the first vehicle;
   determining a type of the second vehicle in size based on the image; and
   determining whether the second vehicle is an emergency vehicle based on the image.

9. The method according to claim 8 further comprising the step of informing a driver driving the first vehicle of information on the results determined by the determining steps.

10. The method according to claim 8, wherein determination of whether the second vehicle is the emergency vehicle is made by comparing intensity in the second vehicle of the image with the reference intensity.

11. The method according to claim 8, wherein the detecting step includes:
    taking an image as a reference image of the object existing behind the first vehicle; and
    taking an image of the object for comparison with the reference image in stereo image processing to obtain three-dimensional distance distribution of the object from the first vehicle.

12. The method according to claim 11, wherein the detecting step further includes recognizing the object as the second vehicle travelling behind based on a distance of the object from the first vehicle in the three-dimensional distance distribution.

13. The method according to claim 11, wherein the type determining step includes the step of comparing the object recognized as the second vehicle travelling behind with reference objects in size to determine the second vehicle as a large vehicle, a medium-size or compact vehicle or two-wheeled vehicle.

14. The method according to claim 11, wherein the emergency-vehicle determining step includes:
    comparing intensity on a specific area on the object recognized as the second vehicle travelling behind with reference intensity in the image, the specific area depending on the type of the second vehicle; and
    determining that the second vehicle is equipped with a flashing light, thus deciding that the second vehicle is the emergency vehicle, if the intensity on the specific area is higher than the reference intensity and exhibits periodical change.

15. An apparatus for recognizing a vehicle travelling behind comprising:
- a detector for detecting an image of an object existing behind a first vehicle for recognizing a second vehicle which is the object traveling behind the first vehicle;
- a first determining unit for determining a type of the second vehicle in the size based on the image; and
- a second determining unit for comparing intensity on a specific area on the second vehicle travelling behind with reference intensity in the image, the specific area depending on the type of the second vehicle, and for determining that the second vehicle is an emergency vehicle equipped with a flashing light, if the intensity on the specific area is higher than the reference intensity and exhibits periodical change.

16. A method of recognizing a vehicle traveling behind comprising:
- detecting an image of an object existing behind a first vehicle for recognizing a second vehicle which is the object traveling behind the first vehicle;
- determining a type of the second vehicle in size based on the image;
- comparing intensity on a specific area on the second vehicle traveling behind with reference intensity in the image, the specific area depending on the type of the second vehicle; and
- determining that the second vehicle is an emergency vehicle equipped with a flashing light, if the intensity in the specific area is higher than the reference intensity and exhibits periodical change.

* * * * *